(12) United States Patent
Cyrus et al.

(10) Patent No.: US 9,231,405 B2
(45) Date of Patent: Jan. 5, 2016

(54) SYSTEM AND METHOD FOR OPERATING A DISTRIBUTED ENERGY GENERATING PLANT USING A RENEWABLE SOURCE OF ENERGY

(71) Applicant: SUNLIGHT PHOTONICS INC., South Plainfield, NJ (US)

(72) Inventors: Michael Cyrus, Castle Rock, CO (US); Sergey V. Frolov, New Providence, NJ (US)

(73) Assignee: SUNLIGHT PHOTONICS INC., Edison, NJ (US)

( * ) Notice: Subject to any disclaimer, the term of this patent is extended or adjusted under 35 U.S.C. 154(b) by 0 days.

(21) Appl. No.: 14/015,372

(22) Filed: Aug. 30, 2013

(65) Prior Publication Data

US 2013/0342021 A1 Dec. 26, 2013

Related U.S. Application Data

(63) Continuation of application No. 13/351,075, filed on Jan. 16, 2012, now Pat. No. 8,552,582, which is a continuation of application No. 11/860,450, filed on Sep. 24, 2007, now Pat. No. 8,097,980.

(51) Int. Cl.
*H02J 3/02* (2006.01)
*H02J 3/00* (2006.01)
*H02J 3/38* (2006.01)

(52) U.S. Cl.
CPC . *H02J 3/00* (2013.01); *H02J 3/383* (2013.01); *Y02E 10/563* (2013.01); *Y10T 307/615* (2015.04); *Y10T 307/642* (2015.04); *Y10T 307/658* (2015.04); *Y10T 307/718* (2015.04)

(58) Field of Classification Search
CPC .......................................................... H02J 3/02
USPC ........................................... 307/2, 69, 72, 84
See application file for complete search history.

(56) References Cited

U.S. PATENT DOCUMENTS

| 3,300,570 | A |   | 1/1967 | Spiece et al. |         |
|-----------|---|---|--------|---------------|---------|
| 4,200,904 | A | * | 4/1980 | Doan          | 362/183 |
| 4,224,082 | A | * | 9/1980 | Jacobson      | 136/248 |
| 4,281,369 | A | * | 7/1981 | Batte         | 362/183 |
| 4,291,233 | A | * | 9/1981 | Kirschbaum    | 290/1 C |

(Continued)

FOREIGN PATENT DOCUMENTS

| EP | 1 612 906 A1 | 1/2006 |
|----|--------------|--------|
| WO | WO 96/06481  | 2/1996 |

(Continued)

OTHER PUBLICATIONS

International Search Report and Written Opinion mailed Nov. 25, 2008 for PCT Application No. PCT/US2008/075123.

(Continued)

*Primary Examiner* — Adi Amrany
(74) *Attorney, Agent, or Firm* — Moser Taboada; Alan Taboada

(57) ABSTRACT

Methods and apparatus are provided for using a renewable source of energy such as solar, wind, or geothermal energy. In some embodiments, the method may include generating electric energy from a renewable form of energy at a plurality of locations at which reside an electric power line associated with an electric power grid. The electric energy generated at each location may be transferred to the electric power line to thereby supply electric energy to the electric power grid.

20 Claims, 3 Drawing Sheets

(56) References Cited

U.S. PATENT DOCUMENTS

| | | | |
|---|---|---|---|
| 4,357,542 A * | 11/1982 | Kirschbaum | 290/44 |
| 5,040,948 A * | 8/1991 | Harburg | 416/85 |
| 6,400,039 B1 * | 6/2002 | Wobben | 290/44 |
| 6,455,767 B1 * | 9/2002 | Muller | 136/245 |
| 6,559,371 B2 | 5/2003 | Shingleton et al. | |
| 6,784,357 B1 | 8/2004 | Wang | |
| 6,930,237 B2 | 8/2005 | Mattiuzzo | |
| 7,071,579 B2 * | 7/2006 | Erdman et al. | 290/55 |
| 7,075,189 B2 * | 7/2006 | Heronemus et al. | 290/44 |
| 7,180,270 B2 | 2/2007 | Rufer et al. | |
| 7,239,044 B1 | 7/2007 | Atcitty et al. | |
| 7,253,537 B2 | 8/2007 | Weng et al. | |
| 7,317,405 B2 * | 1/2008 | Green et al. | 340/907 |
| 7,321,173 B2 * | 1/2008 | Mann | 290/55 |
| 7,339,287 B2 | 3/2008 | Jepsen et al. | |
| 7,479,774 B2 | 1/2009 | Wai et al. | |
| 7,501,713 B2 * | 3/2009 | Fein et al. | 290/44 |
| 7,518,266 B2 | 4/2009 | Eckroad | |
| 7,731,383 B2 | 6/2010 | Myer | |
| 7,793,467 B1 * | 9/2010 | Melton et al. | 52/79.1 |
| 7,834,485 B2 | 11/2010 | Park | |
| 7,976,180 B1 | 7/2011 | Haun et al. | |
| 8,007,124 B2 | 8/2011 | Kim | |
| 8,077,437 B2 | 12/2011 | Mumtaz et al. | |
| 8,253,273 B2 | 8/2012 | Fredette et al. | |
| 8,275,489 B1 | 9/2012 | Devine | |
| 2002/0103745 A1 | 8/2002 | Lof et al. | |
| 2005/0078491 A1 | 4/2005 | Song et al. | |
| 2005/0081908 A1 | 4/2005 | Stewart | |
| 2005/0121214 A1 * | 6/2005 | Gould | 174/40 R |
| 2005/0230980 A1 * | 10/2005 | Brunet | 290/44 |
| 2006/0062034 A1 | 3/2006 | Mazumder et al. | |
| 2007/0013194 A1 * | 1/2007 | Calley | 290/44 |
| 2007/0052244 A1 | 3/2007 | Hudson | |
| 2007/0100506 A1 | 5/2007 | Teichmann | |
| 2007/0117017 A1 | 5/2007 | Sugiyama et al. | |
| 2008/0137327 A1 | 6/2008 | Hodulik | |
| 2008/0266922 A1 | 10/2008 | Mumtaz et al. | |
| 2010/0139735 A1 | 6/2010 | Anderson | |
| 2011/0017256 A1 | 1/2011 | Stevens | |
| 2011/0305010 A1 | 12/2011 | Leadford et al. | |
| 2012/0280570 A1 | 11/2012 | Smythe et al. | |
| 2012/0302228 A1 | 11/2012 | Gray | |
| 2013/0000632 A1 | 1/2013 | Lundahl et al. | |

FOREIGN PATENT DOCUMENTS

| | | |
|---|---|---|
| WO | WO 03/036688 A2 | 5/2003 |
| WO | WO 2006/119649 A1 | 11/2006 |

OTHER PUBLICATIONS

Extended European Search Report dated May 2, 2013 for European Application No. 08834431.2-1804/2238522; PCT/US2008075123.

"Electrical Engineering Between Energy and Information", Werner Leonhard, Technical University Braunshweig, pp. 197-202.

* cited by examiner

SYSTEM AND METHOD FOR OPERATING A DISTRIBUTED ENERGY GENERATING PLANT USING A RENEWABLE SOURCE OF ENERGY

CROSS-REFERENCE TO RELATED APPLICATIONS

This application is a continuation of co-pending U.S. patent application Ser. No. 13/351,075, filed Jan. 16, 2012, which is a continuation of U.S. patent application Ser. No. 11/860,450, filed Sep. 24, 2007, now U.S. Pat. No. 8,097,980, issued Jan. 17, 2012. The aforementioned related patent applications are herein incorporated by reference in their entireties.

FIELD

The present invention relates to an electric power producing plant that is distributed along the path of existing power lines, and which is connected to the electric grid at multiple locations along the power lines.

BACKGROUND

Renewable energy with low carbon dioxide profile is becoming increasingly important, as the world works to reduce the carbon dioxide emission and preserve the Earth. In many cases smaller renewable energy plants, like solar photovoltaic farms, wind turbines farms, solar thermal plants, etc. are selling their excess energy into the existing external electric power grids. The current mode of operation consists of concentrating the power sources from the entire farm and combining their outputs into one, which is then connected to the grid. There are obvious advantages in this approach main of which is the ease of maintenance. Nevertheless, there are a number of disadvantages, which this invention is addressing.

One of major requirements for an energy plant is the availability of a sufficiently large parcel of land to locate the plant. In busy and densely populated areas this requirement can be a big obstacle, since the land can be very expensive or unavailable.

SUMMARY

A new method of supplying energy from power generators to an energy grid is provided. In accordance with the present invention, the electric power generators are distributed along the grid and each individual energy generator is directly connected to the grid at these locations. Such an arrangement can be referred to as a distributed energy plant. One of the advantages of a distributed plant is that it can be located in areas were a traditional plant could not otherwise be located.

In contrast to the present invention, when an energy farm is positioned outside the area of use, the transmission losses can be quite significant. Moreover, the energy farm is usually connected to the energy grid at a single connection point. Thus, the entire supply of energy is only as robust as this connection point. The present invention reduces the risk of complete failure by providing multiple points of connection to the energy grid. This arrangement also advantageously reduces transmission losses, since the energy generators are in close proximity to the electric power lines in the energy grid.

DETAILED DESCRIPTION

Figure 1:
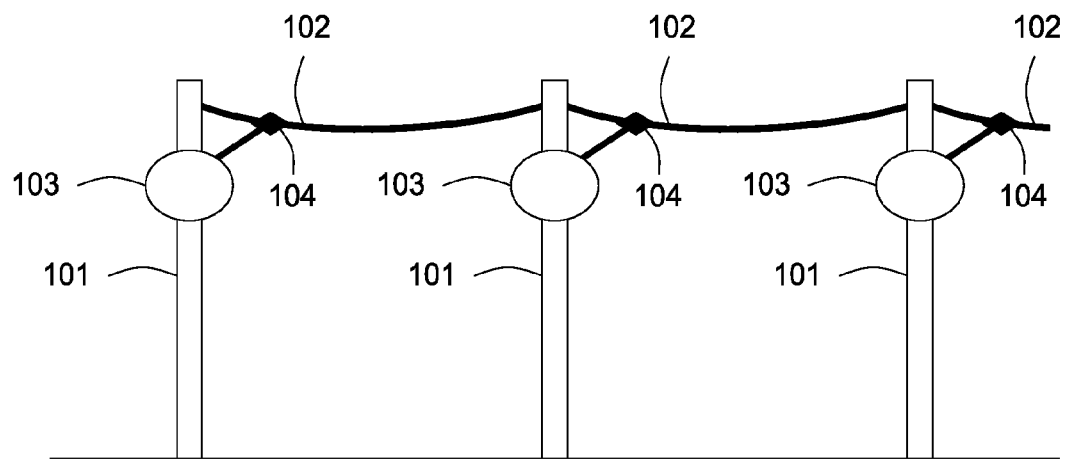
FIG. 1 shows one example of a distributed energy plant constructed in accordance with the present invention.

The proposed scheme is illustrated in FIG. 1. Here individual energy generators 103 are mounted on utility poles 101, and connected to the grid 102 at connection points 104. It is assumed that at each point 104 a DC-AC or a DC-DC converter is facilitating the energy transfer between the energy generator and the grid. An energy generator is typically a photovoltaic solar cell or a wind turbine. Since the utility company usually has the rights to use the land where the grid is located, or owns it outright, no extra land is required to build such an energy plant. Multiple connections inherent in the scheme ensure that the alternative energy supply will not be interrupted, if some of the connections fail.

While this approach could potentially require a larger initial investment to implement, as compared to a traditional localized energy farm and therefore may not look attractive, the main contributors to the initial cost would be the voltage converters. However, future developments in solar cells and other power generators should lead to integrated converters of much lower cost, removing this potential limitation.

Figure 4:
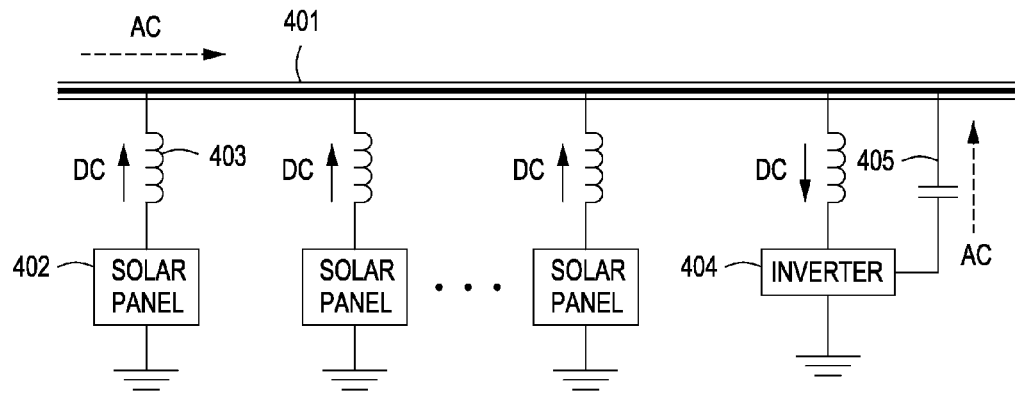
FIG. 4 shows one arrangement for connecting the energy generators to an existing AC grid utilizing low pass and high pass filters.

Furthermore, inverters and other electrical components that may be needed may be located in other more readily accessible parts of the overall electrical grid, which would dramatically reduce both the installation and maintenance costs of a distributed power plant. For example, a large number of solar panels each positioned on a different electrical pole could be electrically connected to a single inverter. The electrical connection could be provided by either dedicated electrical lines or existing electrical lines. In the former case, a large number of solar cells are first connected to a small or medium size DC electrical grid, which directs solar-derived electricity into a large AC electrical grid through a connection point containing a single inverter. In the latter case shown in FIG. 4, the same solar cells 402 could be electrically connected directly to the existing AC power lines 401, thus overlaying a DC-based grid on the existing AC-based grid. The cross-connection(s) between the two grids could occur in a few selected locations via a combination of low pass-filters 403, high pass filters 405 and an inverter 404. Thus an entire distributed solar power plant with a multitude of solar panels could be subdivided into a much smaller number of sections or islands requiring electrical services such as DC-to-AC conversion and others. The latter approach is particularly attractive since it dramatically cuts both the installation and maintenance costs.

Figure 5:
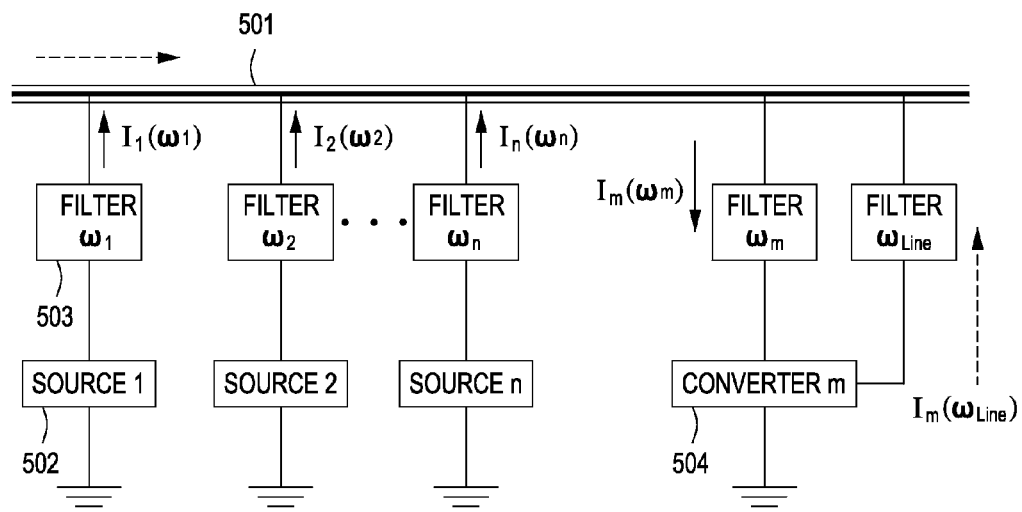
FIG. 5 shows an example in which a variety of different energy sources are employed.

This concept of multiplexing different types of electrical energies into the same electrical power line could be used along with other AC-based renewable energy sources as long as the characteristic frequency of such electrical generators is different from that of the main power line frequency. In this case, electrical bandpass filters could be used to isolate different energy sources from each other and allow electrical connection to the same power line. Thus, a power line 501 with a multitude of different energy sources can be envisioned as shown in FIG. 5, in which various types of electrical energy 502 are provided and multiplexed via bandpass filters 503 at different characteristic frequencies $\square_1$ through $\square_N$, where N is the number of different types of energy sources. A number of electrical energy converters 504 could be connected to the same power line, which would convert different current frequencies to a common line frequency $\square_{Line}$ and thus making it usable for customers elsewhere on the grid. In order to limit electrical current propagation through the grid at non-standard frequencies (different from a common line frequency), electrical buffers or narrow line bandpass filters could be positioned at a few key points along the power grid. Some appropriate insertion points for such buffers include converter connection points, edges of the power grid, and edges of the renewable power sub-grids.

A number of potential implementation of the above idea can be envisioned. The energy generator can be a solar cell, a wind turbine, a solar thermoelectric mini-turbine, etc. An example of an implementation with a solar cell and wind turbine are given below. Most attractive implementations of a distributed power plant are those involving maintenance free components such as solar cell panels or modules.

Example 1

Solar Cell

Figures 2A, 2B:
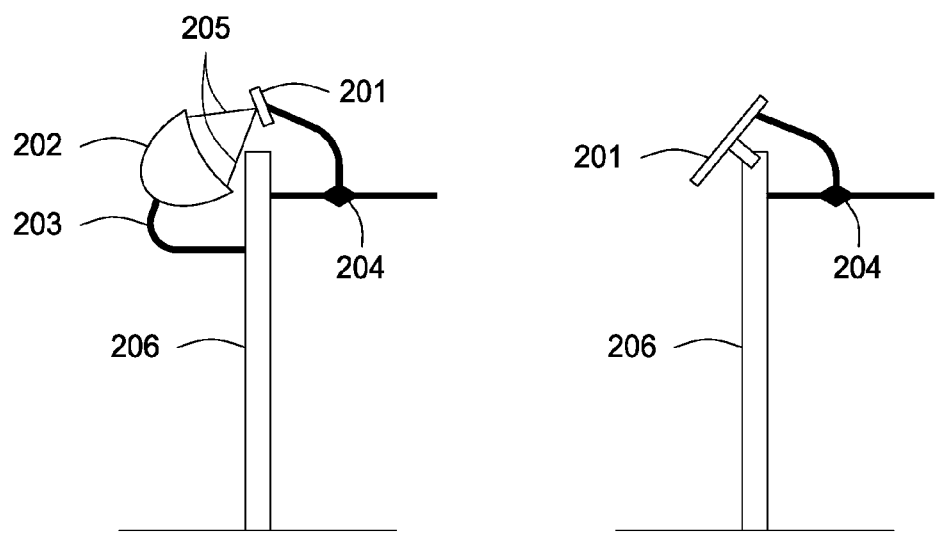
FIGS. 2a and 2b show specific examples of an energy generator that includes a solar photovoltaic cell with and without a concentrator, respectively.

An individual energy generator of small enough size, such as a solar cell, can be positioned directly on the utility pole and connected to the grid. FIG. 2a illustrates such an arrangement for a solar cell with a concentrator. Concentrator 202 is mounted on the pole 206, and concentrates the rays 205 on a solar cell 201, which is connected to the grid at the point 204 through DC-AC converter. Holder 203 supports the concentrator. One example of such cell is T1000, manufactured by Emcore. It achieves 37% conversion efficiency under proper concentrator illumination. FIG. 2b illustrates an arrangement for a standard solar cell without a concentrator. Here solar cell 201 is mounted on a pole 206 and connected to the grid via connection in point 204 through a DC-AC converter. An example of such cell can be a polycrystalline silicon photovoltaic cell KC50T manufactured by Kyocera. With 16% conversion efficiency and 25 years power output warranty it is a representative example of the current technology that may be employed.

Example 2

Wind Turbine

Figure 3:
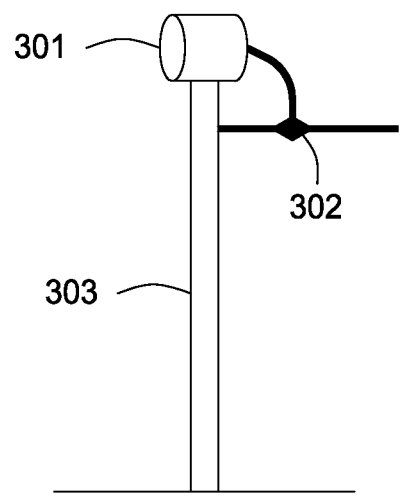
FIG. 3 shows an example in which the energy generator is a wind turbine.

In this example a wind turbine is positioned on the utility pole and connected to the grid. FIG. 3 illustrates such an arrangement. A wind turbine 301 is mounted on a pole 303 and connected to the grid at point 302 through an appropriate converter, supplying energy directly into the grid. One example of such turbine is the Inclin 600 manufactured by Bornay.

Although various embodiments and examples are specifically illustrated and described herein, it will be appreciated that modifications and variations are covered by the above teachings.

The invention claimed is:

1. A method for operating a distributed energy generating plant using a renewable source of energy, comprising:
  generating electric energy from a renewable form of energy at a plurality of locations at which reside a pre-existing AC electric power line in an AC electric power grid, wherein the electric energy is generated by a plurality of energy generators, each of the plurality of energy generators mounted to a different supporting structure that supports the electric power line at one of the plurality of locations, wherein at least some of the plurality of energy generators comprise photovoltaic energy generators;
  transferring the electric energy generated at each location to the AC electric power line at each respective location to thereby supply electric energy to the AC electric power grid; and
  inverting the electric energy generated by two or more of the plurality of energy generators located on different supporting structures at a single unidirectional inverter, wherein the single unidirectional inverter transfers AC electric energy only to the AC electric power line.

2. The method of claim 1, wherein the renewable form of energy is solar energy.

3. The method of claim 1, wherein the renewable form of energy is solar energy and further comprising concentrating the solar energy onto a solar cell arrangement that generates the electric energy.

4. The method of claim 1, wherein the plurality of locations are locations at which a utility operator of the AC electric power grid has a right of way to use the location.

5. The method of claim 1, wherein substantially all of said generated electric energy is transferred to the AC electric power grid.

6. The method of claim 1, wherein the electric energy generated is DC electric energy.

7. The method of claim 1, wherein a characteristic frequency of the electric energy generated at each location is different from a characteristic frequency of the AC electric power line.

8. In an AC electric power grid that includes a pre-existing AC electric power line, a distributed energy generating plant comprising:
  a plurality of energy generators that convert a renewable form of energy into electric energy, wherein at least some of the plurality of energy generators comprise photovoltaic energy generators;
  a plurality of energy transfer elements that transfer the electric energy generated by the respective energy generators to the AC electric power line at different locations along the AC electric power line, wherein the plurality of energy transfer elements transfer electric energy only to the AC electric power line;
  a plurality of supports that support the electric power line, wherein each of the plurality of energy generators and its associated energy transfer element is secured to a respective one of the plurality of supports; and
  a single unidirectional inverter configured to invert the electric energy generated by two or more of the plurality of energy generators each located on different supports, wherein the single unidirectional inverter transfers AC electric energy only to the AC electric power line.

9. The distributed energy generating plant of claim 8, wherein the at least one energy transfer element of the plurality of energy transfer elements resides at a location remote from said energy generators.

10. The distributed energy generating plant of claim 8, wherein the energy transfer elements comprise a DC-AC converter.

11. The distributed energy generating plant of claim 8, wherein the photovoltaic energy generators include a solar cell arrangement that comprises a concentrator for concentrating solar energy onto each solar cell in the solar cell arrangement.

12. The distributed energy generating plant of claim 8, wherein the plurality of energy generators further comprise a wind turbine.

13. The distributed energy generating plant of claim 8, wherein the plurality of energy generators further comprise a thermoelectric generator.

14. The distributed energy generating plant of claim 8, wherein each of said energy transfer elements converts electrical energies from at least two said energy generators.

15. The distributed energy generating plant of claim 8, wherein said energy generators are first connected to a separate electrical sub-grid.

16. The distributed energy generating plant of claim 15, wherein said energy transfer elements connect said separate electrical sub-grid to an existing electrical grid.

17. The distributed energy generating plant of claim 15, wherein said energy transfer elements convert and transfer energy from said energy generators to an existing electrical grid via high-pass and low-pass electrical filters.

18. The distributed energy generating plant of claim 8, wherein each energy generator and its associated energy transfer element reside at one of the different locations.

19. The distributed energy generating plant of claim 8, wherein a characteristic frequency of the electric energy generated at each location is different from a characteristic frequency of the AC electric power line.

20. A method for using a renewable source of energy in a distributed energy generating plant, comprising:

generating electric energy from a renewable form of energy at a plurality of locations at which reside a pre-existing AC electric power line in an AC electric power grid, wherein the electric energy is generated by a plurality of energy generators each mounted to a different supporting structure that supports the electric power line at one of the plurality of locations, wherein at least some of the plurality of energy generators comprise photovoltaic energy generators;

transferring the electric energy generated at each location to the AC electric power line at each respective location; and inverting the electric energy generated by two or more of the plurality of energy generators at a single unidirectional inverter, wherein the single unidirectional inverter transfers AC electric energy only to the AC electric power line.

* * * * *